United States Patent
Lu

(10) Patent No.: US 6,761,765 B2
(45) Date of Patent: Jul. 13, 2004

(54) ADMIXTURE FOR CEMENTITIOUS COMPOSITIONS

(75) Inventor: Runhai Lu, Stow, OH (US)

(73) Assignee: Construction Research & Technology GmbH, Trostberg (DE)

( * ) Notice: Subject to any disclaimer, the term of this patent is extended or adjusted under 35 U.S.C. 154(b) by 126 days.

(21) Appl. No.: 09/864,508

(22) Filed: May 24, 2001

(65) Prior Publication Data

US 2002/0100394 A1 Aug. 1, 2002

Related U.S. Application Data

(60) Provisional application No. 60/207,040, filed on May 25, 2000.

(51) Int. Cl.$^7$ ............................ C04B 24/00; C04B 24/04
(52) U.S. Cl. .......................... 106/823; 106/2; 106/696; 106/708; 106/728; 106/801; 106/802; 106/810; 524/4; 524/5
(58) Field of Search ............................ 106/2, 696, 708, 106/728, 801, 802, 810, 823; 524/4, 5

(56) References Cited

U.S. PATENT DOCUMENTS

| | | | |
|---|---|---|---|
| 4,151,150 A | * | 4/1979 | Peters et al. .................... 524/8 |
| 5,112,405 A | | 5/1992 | Sanchez |
| 5,192,366 A | | 3/1993 | Nishioka et al. |
| 5,262,089 A | * | 11/1993 | Bobrowski et al. ......... 252/396 |
| 5,308,397 A | | 5/1994 | Whatcott |
| 5,728,209 A | | 3/1998 | Bury et al. |
| 5,736,600 A | | 4/1998 | Karkare et al. |
| 5,763,508 A | | 6/1998 | Hess et al. |
| 5,846,315 A | | 12/1998 | Johansen, Jr. et al. |
| 5,855,665 A | | 1/1999 | Johansen, Jr. et al. |
| 5,922,124 A | | 7/1999 | Supplee |
| 5,951,752 A | | 9/1999 | Johansen, Jr. et al. |
| 6,139,623 A | * | 10/2000 | Darwin et al. .............. 106/823 |
| 6,258,161 B1 | * | 7/2001 | Kerkar et al. ............... 106/808 |
| 6,403,163 B1 | * | 6/2002 | Fisher et al. ................ 427/387 |
| 6,454,850 B2 | * | 9/2002 | Yamashita et al. .......... 106/724 |

FOREIGN PATENT DOCUMENTS

| | | |
|---|---|---|
| EP | 0 461 738 A1 | 12/1991 |
| EP | 0 431 600 B1 | 7/1994 |
| GB | 938567 A | 10/1963 |
| WO | WO 91/17127 A1 | 11/1991 |
| WO | WO 98/05709 A | 2/1998 |

OTHER PUBLICATIONS

Chemical Abstracts (vol. 109, No. 16) Y. Chiba JP 63 134542 A—Oct. 17, 1988—Columbus, OH USA (Jun. 1988).

Dialog Abstract JPO & JAPIO—Application No. JP64003041 A (Jan. 1989).

* cited by examiner

Primary Examiner—Anthony J. Green
(74) Attorney, Agent, or Firm—Renner, Kenner, Greive, Bobak, Taylor & Weber

(57) ABSTRACT

An admixture for cementitious compositions for imparting water repellant properties to the cementitious composition. The admixture comprises a polymer, a surfactant, and a hydrophobic material that is an organic ester of an aliphatic carboxylic acid. Also, a cementitious composition comprising cement, a polymer, a surfactant, and a hydrophobic material that is an organic ester of an aliphatic carboxylic acid. Also, a method of forming a cementitious composition comprising mixing a cement, a polymer, a hydrophobic material, a surfactant, and water.

35 Claims, No Drawings

ADMIXTURE FOR CEMENTITIOUS COMPOSITIONS

CROSS REFERENCE TO RELATED APPLICATIONS

This application claims the benefit of the filing date of U.S. Provisional Application for Patent No. 60/207,040, filed May 25, 2000.

FIELD OF THE INVENTION

Generally, the present invention is directed to an admixture for cementitious compositions. More particularly, the present invention is directed to an admixture that imparts water repellant properties to cementitious compositions.

BACKGROUND OF THE INVENTION

A cementitious mixture refers to pastes, mortars, and concrete compositions comprising a hydraulic cement binder having consistencies ranging from stiff to extremely dry as defined in ACI 211.3R, Table 2.3.1. Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture that does not adversely affect the advantageous results obtained by the admixtures of the present invention.

Cementitious cast mixtures are used to form many articles, for example, concrete pipe, roof tile, masonry units, paver units, extruded plank, and any other preformed cementitious articles, in a mold or from an extrusion die. Each of these applications has basic desired characteristics that are critical in terms of producing quality finished units.

In masonry block applications, production speed, sufficient green strength, and the ability to resist slumping, sagging or deforming when stripped from the mold is critical since stripping occurs immediately after casting. The same is true for concrete pipe or roof tile with the additional desired property of improved surface appearance with reduced surface imperfections and reduced roller and/or die wear on equipment producing extruded pieces.

It is desired to reduce the cycle time of the manufacture of each article. The reduction of cycle time reduces the cost of manufacture for each article and increases the number of articles that can be produced in a given time. Cycle time is defined as the time to complete one full cycle from the beginning of feed to the end, or next beginning of feed. The beginning of feed is when the cast mixture is fed from a collection hopper into the process. It is also desired to improve the compaction and consolidation of the cementitious cast mixture without altering the consistency of the mixture.

Green strength refers to the stability of the article in retaining its shape once the article is removed from the mold or extruder. Green strength is dependent on the consistency of the cementitious cast mixture, the amount of fines in the cementitious cast mixture, and the moldability of the cementitious cast mixture.

Currently, the water to cement (W/C) ratio used in present cast mixtures is from about 0.25 to about 0.60. It is desired to minimize the amount of water needed in a cementitious cast mixture to achieve consolidation and no sag or deformation in an article produced from the cementitious cast mixture.

Another property of cementitious cast mixtures for certain cast industries is swipe. Swipe is defined as surface effect on a cast article when the mold is removed. Swipe is measured by visually evaluating the surface of the finished article. Swipe is ranked from no swipe to heavy swipe. It is desired to achieve a selected amount of swipe for a finished article.

A further limitation in the present art is the compressive strength of articles produced from cementitious mixtures. Early compressive strength is defined as the compressive strength achieved within 24 hours with or without steam cure. Compressive strength is determined by ASTM C-1176-2.

Another limitation is water permeation through the finished cementitious article. When a cementitious article becomes wetted, such as by direct contact or from rain, water can penetrate the article. This occurs because cementitious articles are porous. The water can make the article appear unsightly, and bacteria or fungus can then grow on the damp article. Typically, a water repellant material has to be applied to a finished cementitious article to protect the article from water penetration. This requires additional steps and costs.

What is needed in the art is an admixture that can be directly added to a cementitious mixture to provide water-repellant properties and to increase the compressive strength of a formed cementitious article. What is also needed in the art is a reduction in cycle time for the formation of a cementitious cast article.

SUMMARY OF THE INVENTION

The present invention provides an admixture for cementitious compositions comprising a polymer, a surfactant, and a hydrophobic material that is an organic ester of an aliphatic carboxylic acid.

The present invention also provides a cementitious composition comprising cement, a polymer, a surfactant, and a hydrophobic material that is an organic ester of an aliphatic carboxylic acid.

The present invention also provides a method of forming a cementitious composition comprising mixing a cement, a polymer, a hydrophobic material that is an organic ester of an aliphatic carboxylic acid, a surfactant, and water.

DETAILED DESCRIPTION OF THE INVENTION

The present invention provides an admixture for cementitious compositions that includes a polymer, a surfactant, and a hydrophobic material.

The present invention also provides a cementitious composition that includes a cement, a polymer, a surfactant, and a hydrophobic material.

Also provided by the present invention is a method of forming a cementitious composition that includes mixing a cement, a polymer, a hydrophobic material, a surfactant, and water.

Preferably, the hydrophobic material is an organic ester of an aliphatic carboxylic acid. Preferably, the organic ester of an aliphatic carboxylic acid is represented by the general formula $R_1$–$R_2$, wherein $R_1$ is $C_{12}$–$C_{18}$ aliphatic carboxylic acid ester, and $R_2$ is a linear or branched $C_1$ to $C_{10}$ alkyl. Preferred aliphatic carboxylic acid esters include, but are not limited to, stearate, oleate, naturally occurring oils, laurate, palmitate, myristic ester, and linoleic ester. Preferred hydrophobic materials include, but are not limited to, alkyl stearate esters, alkyl oleate esters, and mixtures thereof. Preferably, the organic ester of a stearate has the general formula $C_{17}H_{35}COOR_3$ and the organic ester of an oleate has the general formula $CH_3(CH_2)_7\!=\!(CH_2)_7COOR_4$, wherein $R_3$ and $R_4$ are each independently a linear or branched $C_1$ to $C_{10}$ alkyl. A preferred stearate is butyl stearate, and a preferred oleate is butyl oleate. Preferred naturally occurring oils include castor oil and coconut oil.

The polymer of the present invention is preferably a latex polymer. Suitable latex polymers include, but are not limited to, styrene butadiene copolymers, polyacrylate latex, polymethacrylate latex, carboxylated styrene latex, isoprene-styrene copolymer. A preferred latex polymer is a styrene butadiene copolymer latex. Generally, the polymer has a number average molecular weight from about 500 to about 50,000. Preferably, the polymer has a number average molecular weight from about 1,000 to about 2,000. A preferred latex polymer is sold under the tradename TYLAC CPS814 from Reichold Chemicals, Inc.

The surfactant can be any surfactant that can emulsify the hydrophobic material. Suitable examples of the surfactant include, but are not limited to, ionic, non-ionic, and amphoteric surfactants. Preferably, the surfactant is at least one of an ethoxylated alkyl phenol. Preferably, the ethoxylated alkyl phenol has the general structure

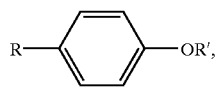

wherein $R=C_1$ to $C_{20}$ alkyl, and $R'=\!-\!(CH_2CH_2\!-\!O)_n\!-\!$, n=1 to 100. A preferred ethoxylated alkyl phenol is ethoxylated nonylphenol, wherein n=8.

Generally, when formulated as an admixture, the polymer is present in the admixture from about 0.5% to about 20% based on the total weight of the admixture, the hydrophobic material is present in the admixture from about 5% to about 60% based on the total weight of the admixture, and the surfactant is present in the admixture from about 0.1% to about 20% based on the total weight of the admixture. In one preferred embodiment, the polymer is present in the admixture from about 0.5% to about 20% based on the total weight of the admixture, the hydrophobic material is present in the admixture from about 20% to about 50% based on the total weight of the admixture, and the surfactant is present in the admixture from about 3% to about 15% based on the total weight of the admixture.

Generally, when the admixture is added to a cementitious mixture, the admixture is added in an amount from about 2 to about 40 fluid ounces per hundred weight of cement (oz./cwt). Preferably, the admixture is added to a cementitious mixture in an amount from about 4 to about 20 oz./cwt.

The cement in the cementitious composition can be any known cement. Suitable types of cement include, but are not limited to, calcium aluminate cement, hydratable alumina, hydratable aluminum oxide, colloidal silica, silicon oxide, portland cement, magnesia, pozzolan containing cements, and mixtures thereof. Preferably, the cement is Type I portland cement.

The cementitious composition can also contain any other known additive for cement that does not affect the desired properties of the present invention. Types of additives include, but are not limited to, set accelerators, set retarders, air entraining agents, air detraining agents, foaming agents, defoaming agents, corrosion inhibitors, shrinkage reducing agents, pozzolans, dispersing agents, pigments, coarse aggregate, and fine aggregate. Other additives that can be used in cementitious compositions can be found in U.S. Pat. No. 5,728,209 to Bury et al., which is incorporated herein by reference. Fine aggregates are materials that pass through a Number 4 sieve (ASTM C125 and ASTM C33), such as silica sand. Coarse aggregates are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

The admixture of the present invention imparts water repellant properties and prevents water permeation in poured concrete and in articles formed from cementitious compositions. These articles can include wet cast concrete, dry cast concrete, and manufactured concrete products. Without being limited to theory, it is theorized that the hydrophobic material provides the water repellant properties. By being mixed into the cementitious mixture, the hydrophobic material is substantially evenly distributed in the cementitious matrix, as well as on the surface, where it prevents the wetting of the cementitious article, and also reduces the efflorescence. This prevents water from entering or releasing from the cementitious structure, which can be porous. This is particularly the case for manufactured concrete products, such as blocks, pavers, and retaining wall units.

The polymeric material provides further resistance to prevent water permeation, particularly when the water is being driven against the surface of the cementitious article, such as during a rain storm. The polymeric material closes the inter-connected porosity inside the cementitious article to prevent water from penetrating through the cementitious article. Preferably, the particle size of the polymer is from about 0.3 to about 10 μm to allow blocking of the pores in the cementitious article.

The admixture can also function as a lubricant and plasticizer. In a molding operation, this can reduce the friction between the cementitious matrix and can increase the efficiency of a remolding process. Also, the admixture can increase the workability of concrete.

Cementitious articles containing the admixture of the present invention can also pass a vacuum test (ASTM C1244). One side of a cementitious article is subjected to a sustained pressure of 15 inches of Hg for three minutes. The cementitious article is able to maintain the pressure with no more than a ½ inch loss of vacuum.

Cementitious articles formulated with the admixture of the present invention are also able to pass the freeze-thaw test of ASTM C1262 with a weight loss of less than 1% after 200 cycles of freezing and thawing. The cementitious articles can also meet the requirements of ASTM C1372 for segmental retaining wall units.

Also, these cementitious articles have an increased compressive strength (as measured by ASTM C90 or ASTM C140), because of keeping more water in the system, which is used for more hydration. The increase has been measured as being up to 30%. Also, in the manufacture of cast articles, the production cycle time can be reduced up to about 10% or more.

Advantages of the present invention include low permeability, low shrinkage for better bonding and less cracking, and more environmentally friendly.

SPECIFIC EMBODIMENT OF THE INVENTION

The above described invention can be demonstrated by, but is not limited to, the following examples.

EXAMPLE 1

Samples were prepared as 8"×8"×16", 2-core medium weight blocks. The blocks were made from a typical mixture containing cement, aggregate, an admixture, and a sufficient amount of water for casting a block. The admixture for each set of testing that was added to the block mixture is indicated below. The amount of admixture added was based on adding the admixture at fluid ounces per hundred weight of cement (oz./cwt). The blocks were tested according to ASTM C140 for compressive strength, the results for each test are indicated in the tables below, and according to ASTM C90 for compressive strength for loadbearing concrete masonry units. Set A was a mixture that contained a competitive water repellant admixture, 100S, from Sika, Zürich, Switzerland. Sets B–D contained an admixture that contained 40% butyl stearate, 3% carboxylated styrene butadiene latex, 8% ethoxylated nonylphenol, and 49% water by weight.

Set A
Admixture - Reference Mix (100 s @ 2 oz/cwt)

| Unit | Gross Area in$^2$ | Total Load lb. | Compressive Strength (psi) Gross Area | Compressive Strength (psi) Net Area | Received Weight (lb.) |
|---|---|---|---|---|---|
| A-1 | 119 | 120,020 | 1,010 | 1,970 | 34.40 |
| A-2 | 119 | 109,380 | 920 | 1,790 | 34.06 |
| A-3 | 119 | 112,480 | 950 | 1,840 | 33.86 |

These blocks failed the compressive strength requirements of ASTM C90.

Set B
Admixture @ 2 oz/cwt

| Test | Gross Area in$^2$ | Total Load lb. | Compressive Strength (psi) Gross Area | Compressive Strength (psi) Net Area | Received Weight (lb.) |
|---|---|---|---|---|---|
| B-1 | 119 | 121,330 | 1,020 | 2,020 | 34.22 |
| B-2 | 119 | 121,500 | 1,020 | 2,030 | 34.44 |
| B-3 | 119 | 129,660 | 1,090 | 2,160 | 34.90 |

These blocks passed the compressive strength requirements of ASTM C90.

Set C
Admixture @ 6 oz/cwt

| Unit | Gross Area in$^2$ | Total Load lb. | Compressive Strength (psi) Gross Area | Compressive Strength (psi) Net Area | Received Weight (lb.) |
|---|---|---|---|---|---|
| C-1 | 119 | 108,320 | 910 | 1,810 | 34.36 |
| C-2 | 119 | 118,520 | 1,000 | 1,980 | 34.48 |
| C-3 | 119 | 104,020 | 870 | 1,730 | 34.30 |

These blocks failed the compressive strength requirements of ASTM C90.

Set D
Admixture @ 25 oz/cwt

| Unit | Gross Area in$^2$ | Total Load lb. | Compressive Strength (psi) Gross Area | Compressive Strength (psi) Net Area | Received Weight (lb.) |
|---|---|---|---|---|---|
| D-1 | 119 | 132,660 | 1,110 | 2,170 | 35.78 |
| D-2 | 119 | 135,800 | 1,140 | 2,230 | 36.32 |
| D-3 | 119 | 143,720 | 1,210 | 2,360 | 36.32 |

These blocks passed the compressive strength requirements of ASTM C90.

The mixtures from Sets A–D were repeated and formed as blocks as above. The compressive strength and absorption were tested according to ASTM C140. The results are listed below.

SET A
Admixture - Reference Mix (100 s @ 2 oz/cwt)

| Unit | Gross Area in$^2$ | Total Load lb. | Compressive Strength (psi) Gross Area | Compressive Strength (psi) Net Area | Received Weight (lb.) |
|---|---|---|---|---|---|
| A-4 | 119 | 141,840 | 1,190 | 2,280 | 34.58 |
| A-5 | 119 | 146,500 | 1,230 | 2,440 | 34.22 |
| A-6 | 119 | 141,660 | 1,190 | 2,350 | 34.64 |

| Unit | Dimensions (inches) Length | Dimensions (inches) Width | Dimensions (inches) Height | Face Shell Thickness (inches) Minimum Side | Face Shell Thickness (inches) Opposite Side | Face Shell Thickness (inches) Average |
|---|---|---|---|---|---|---|
| A-4 | 15.61 | 7.62 | 7.65 | 1.26 | 1.26 | 1.26 |
| A-5 | 15.61 | 7.63 | 7.63 | 1.26 | 1.27 | 1.27 |
| A-6 | 15.61 | 7.63 | 7.65 | 1.26 | 1.26 | 1.26 |

| Unit | Web Thickness (inches) W-1 | Web Thickness (inches) W-2 | Web Thickness (inches) W-3 | Min. End Flange Thickness (in.) | Equivalent Web Thickness (in.) |
|---|---|---|---|---|---|
| A-4 | 1.03 | 1.04 | 1.00 | 2.00 | 2.37 |
| A-5 | 1.01 | 1.05 | 1.04 | 1.99 | 2.38 |
| A-6 | 1.01 | 1.04 | 1.03 | 1.99 | 2.36 |

| Unit | Absorption lb/ft$^3$ | Density lb/ft$^3$ | Moisture as Received as % total absorbed | Moisture as Received as % dry weight | % Total Absorbed |
|---|---|---|---|---|---|
| A-4 | 12 | 122 | 39 | 4 | 10 |
| A-5 | 13 | 123 | 39 | 4 | 11 |
| A-6 | 13 | 124 | 46 | 5 | 10 |

| Unit | Net Volume (ft$^3$) | Gross Volume (ft$^3$) | Net Area % Solid | Net Area (in$^2$) | Received Weight (lb) |
|---|---|---|---|---|---|
| A-4 | 0.275 | 0.526 | 52.3 | 62.2 | 34.70 |
| A-5 | 0.265 | 0.525 | 50.5 | 60.0 | 33.94 |
| A-6 | 0.267 | 0.527 | 50.7 | 60.4 | 34.74 |

Equivalent Thickness=3.9 inches

Fire Rating (BOCA National Building Code/Table 4.7,1, 1994)=1.9 hours

These blocks pass the requirements of ASTM C90 for Type 2 units.

SET B
Admixture - @ 2 oz/cwt

| Unit | Gross Area in² | Total Load lb. | Compressive Strength (psi) Gross Area | Compressive Strength (psi) Net Area | Received Weight (lb.) |
|------|------|------|------|------|------|
| A-4 | 119 | 159,620 | 1,340 | 2,640 | 34.16 |
| A-5 | 119 | 166,760 | 1,400 | 2,880 | 34.92 |
| A-6 | 119 | 164,800 | 1,380 | 2,730 | 34.88 |

| | Dimensions (inches) | | | Face Shell Thickness (inches) | | |
|---|---|---|---|---|---|---|
| Unit | Length | Width | Height | Minimum Side | Opposite Side | Average |
| A-4 | 15.62 | 7.64 | 7.61 | 1.26 | 1.26 | 1.26 |
| A-5 | 15.61 | 7.62 | 7.63 | 1.25 | 1.28 | 1.26 |
| A-6 | 15.61 | 7.62 | 7.65 | 1.26 | 1.28 | 1.27 |

| | Web Thickness (inches) | | | Min. End Flange Thickness | Equivalent Web Thickness |
|---|---|---|---|---|---|
| Unit | W-1 | W-2 | W-3 | (in.) | (in.) |
| A-4 | 1.03 | 1.04 | 1.00 | 2.00 | 2.36 |
| A-5 | 1.02 | 1.03 | 1.00 | 2.00 | 2.35 |
| A-6 | 1.02 | 1.03 | 1.03 | 2.00 | 2.37 |

| | | | Moisture as Received | | |
|---|---|---|---|---|---|
| Unit | Absorption lb/ft³ | Density lb/ft³ | as % total absorbed | as % dry weight | % Total Absorbed |
| A-4 | 13 | 123 | 45 | 5 | 11 |
| A-5 | 14 | 128 | 45 | 5 | 11 |
| A-6 | 11 | 126 | 43 | 4 | 9 |

| Unit | Net Volume (ft³) | Gross Volume (ft³) | Net Area % Solid | Net Area (in²) | Received Weight (lb) |
|------|------|------|------|------|------|
| A-4 | 0.266 | 0.525 | 50.7 | 60.4 | 34.42 |
| A-5 | 0.256 | 0.525 | 48.8 | 58.0 | 34.44 |
| A-6 | 0.267 | 0.527 | 50.7 | 60.3 | 35.00 |

Equivalent Thickness=3.8 inches

Fire Rating (BOCA National Building Code/Table 4.7,1, 1994)=1.9 hours

These blocks pass the requirements of ASTM C90 for Type 2 units.

SET C
Admixture - @ 6 oz/cwt

| Unit | Gross Area in² | Total Load lb. | Compressive Strength (psi) Gross Area | Compressive Strength (psi) Net Area | Received Weight (lb.) |
|------|------|------|------|------|------|
| A-4 | 119 | 150,400 | 1,260 | 2,510 | 34.82 |
| A-5 | 119 | 140,780 | 1,180 | 2,340 | 34.16 |
| A-6 | 119 | 146,100 | 1,230 | 2,440 | 34.88 |

| | Dimensions (inches) | | | Face Shell Thickness (inches) | | |
|---|---|---|---|---|---|---|
| Unit | Length | Width | Height | Minimum Side | Opposite Side | Average |
| A-4 | 15.61 | 7.62 | 7.66 | 1.24 | 1.29 | 1.26 |
| A-5 | 15.60 | 7.62 | 7.66 | 1.26 | 1.28 | 1.27 |
| A-6 | 15.60 | 7.63 | 7.64 | 1.25 | 1.27 | 1.26 |

| | Web Thickness (inches) | | | Min. End Flange Thickness | Equivalent Web Thickness |
|---|---|---|---|---|---|
| Unit | W-1 | W-2 | W-3 | (in.) | (in.) |
| A-4 | 0.99 | 1.04 | 1.04 | 1.99 | 2.37 |
| A-5 | 1.03 | 1.04 | 1.01 | 2.00 | 2.37 |
| A-6 | 1.04 | 1.05 | 1.01 | 2.00 | 2.38 |

| | | | Moisture as Received | | |
|---|---|---|---|---|---|
| Unit | Absorption lb/ft³ | Density lb/ft³ | as % total absorbed | as % dry weight | % Total Absorbed |
| A-4 | 14 | 123 | 42 | 5 | 11 |
| A-5 | 13 | 125 | 48 | 5 | 10 |
| A-6 | 13 | 124 | 43 | 4 | 11 |

| Unit | Net Volume (ft³) | Gross Volume (ft³) | Net Area % Solid | Net Area (in²) | Received Weight (lb) |
|------|------|------|------|------|------|
| A-4 | 0.266 | 0.527 | 50.5 | 60.0 | 34.26 |
| A-5 | 0.267 | 0.527 | 50.7 | 60.2 | 35.00 |
| A-6 | 0.265 | 0.526 | 50.4 | 59.9 | 34.42 |

Equivalent Thickness=3.8 inches

Fire Rating (BOCA National Building Code/Table 4.7,1, 1994)=1.9 hours

These blocks pass the requirements of ASTM C90 for Type 2 units.

SET D
Admixture - @ 25 oz/cwt

| Unit | Gross Area in² | Total Load lb. | Compressive Strength (psi) Gross Area | Compressive Strength (psi) Net Area | Received Weight (lb.) |
|------|------|------|------|------|------|
| A-4 | 119 | 191,020 | 1,610 | 3,140 | 35.82 |
| A-5 | 119 | 189,620 | 1,590 | 3,120 | 36.26 |
| A-6 | 119 | 178,800 | 1,500 | 2,940 | 36.22 |

| | Dimensions (inches) | | | Face Shell Thickness (inches) | | |
|---|---|---|---|---|---|---|
| Unit | Length | Width | Height | Minimum Side | Opposite Side | Average |
| A-4 | 15.62 | 7.64 | 7.65 | 1.26 | 1.26 | 1.26 |
| A-5 | 15.62 | 7.64 | 7.66 | 1.26 | 1.27 | 1.26 |
| A-6 | 15.64 | 7.66 | 7.64 | 1.26 | 1.26 | 1.26 |

| | Web Thickness (inches) | | | Min. End Flange Thickness | Equivalent Web Thickness |
|---|---|---|---|---|---|
| Unit | W-1 | W-2 | W-3 | (in.) | (in.) |
| A-4 | 1.03 | 1.04 | 1.01 | 2.00 | 2.36 |
| A-5 | 1.04 | 1.04 | 1.00 | 2.00 | 2.37 |
| A-6 | 1.03 | 1.04 | 1.01 | 2.00 | 2.36 |

-continued

| Unit | Absorption lb/ft³ | Density lb/ft³ | Moisture as Received | | |
|---|---|---|---|---|---|
| | | | as % total absorbed | as % dry weight | % Total Absorbed |
| A-4 | 11 | 128 | 58 | 5 | 8 |
| A-5 | 11 | 128 | 57 | 5 | 9 |
| A-6 | 11 | 128 | 51 | 4 | 8 |

| Unit | Net Volume (ft³) | Gross Volume (ft³) | Net Area % Solid | Net Area (in²) | Received Weight (lb) |
|---|---|---|---|---|---|
| A-4 | 0.269 | 0.528 | 50.9 | 60.8 | 36.20 |
| A-5 | 0.269 | 0.529 | 50.9 | 60.7 | 36.10 |
| A-6 | 0.269 | 0.529 | 50.9 | 60.8 | 35.92 |

Equivalent Thickness=3.9 inches

Fire Rating (BOCA National Building Code/Table 4.7,1, 1994)=1.9 hours

These blocks pass the requirements of ASTM C90 for Type 2 units.

Experiment 2

Several comparative mixtures were prepared and cast into blocks at different block manufacturing facilities. The compositions and the test run for each mix are detailed below in Tables 2-1 and 2-2. The admixture contained 40% butyl stearate, 3% carboxylated styrene butadiene latex, 8% ethoxylated nonylphenol, and 49% water by weight. Also, sufficient amount of water was added in order to provide a castable mixture.

TABLE 2-1

| Material | Unit | 1 (Control) | 2 | 3 | 4 |
|---|---|---|---|---|---|
| Cement, Type 1 | lbs. | 450 | 450 | 450 | 430 |
| Slag Cement | lbs. | 50 | 50 | 50 | 45 |
| Cement Reduction | % | — | 0% | 0% | 5% |
| Slag Cement % | % | 0% | 10% | 10% | 9% |
| Sand | lbs. | 1160 | 1160 | 1160 | 1160 |
| Pea Rock | lbs. | 1040 | 1040 | 1040 | 1040 |
| #10 Screenings | lbs. | 1800 | 1800 | 1800 | 1800 |
| water repellant admixture sold under the name RHEOMIX ® 235 from Master Builders, Inc., Cleveland, Ohio | floz | 35 | 0 | 0 | 0 |
| plasticizer sold under the name RHEOMIX ® 630S from Master Builders, Inc., Cleveland, Ohio | fl oz | 2 | 0 | 0 | 0 |
| Non-chloride accelerator sold under the name POZZOLITH ® NC 534, from Master Builders, Inc., Cleveland, Ohio. | fl oz | 70 | 70 | 70 | 70 |
| Admixture | floz | 0 | 2 | 4 | 4 |
| Test Results | | | | | |
| Plastic Appearance | | good | good | good | good |
| Swipe | | light | trace | lt.–mod. | lt.–mod. |
| 1 day gross strength | psi | 1180 | 1253 | 1121 | 1043 |
| % of Control | % | — | 106.2% | 95.0% | 88.4% |
| % over 1000 psi | | 18.00% | 25.30% | 12.10% | 4.30% |
| 7 day gross strength | psi | 1516 | 1409 | 1359 | 1538 |
| % of Control | % | — | 92.9% | 89.6% | 101.5% |
| % over 1000 psi | | 51.60% | 40.90% | 35.90% | 53.80% |
| Production Increase | | | | | |
| Feed time | sec | 1.70 | 1.50 | 1.50 | 1.30 |
| Cycle time | sec | 7.60 | 7.20 | 7.40 | 7.30 |
| Cycles/Min | # | 7.89 | 8.33 | 8.11 | 8.22 |
| Est. cycle time | sec | 7.60 | 7.20 | 7.40 | 7.30 |
| Cycle Time Reduction | sec | — | 0.40 | 0.20 | 0.30 |
| Cycle Time Reduction | % | — | 5.3% | 2.6% | 3.9% |
| Production Increase | % | 0 | 5.3 | 2.6 | 3.9 |
| Strength Increase | | | | | |
| 1 day | % | — | 6.2% | -5.0% | -11.6% |
| 7 day | % | — | -7.1% | -10.4% | 1.5% |

The results in Table 2-1 show that the inventive admixture increased the compressive strength and reduced the cycle time to manufacture cast blocks.

TABLE 2-2

| Material | Unit | 1 (Control) | 2 | 3 | 4 | 5 |
|---|---|---|---|---|---|---|
| Cement, Type 1 | lbs | 890 | 890 | 890 | 800 | 800 |
| Fly ash | lbs | 0 | 0 | 0 | 0 | 0 |
| Cement Reduction | % | — | 0% | 0% | 10% | 10% |
| Fly ash % | % | 0% | 0% | 0% | 0% | 0% |
| Sand | lbs | 4038 | 4038 | 4038 | 4038 | 4038 |
| Pea Rock | lbs | 328 | 328 | 328 | 328 | 328 |
| #10 Screenings | lbs | 2700 | 2700 | 2700 | 2700 | 2700 |
| MAXIPLAST plasticizer from W.R. Grace, Cambridge, MA | fl oz | 4 | 0 | 0 | 0 | 0 |
| polymeric carboxylate backbone with polyether group side chains dispersant, sold as RHEOMIX ® 730FC-S from Master Builders, Inc., Cleveland, Ohio | fl oz | 0 | 27 | 45 | 40 | 0 |
| DARACCEL calcium chloride based accelerator from W.R. Grace, Cambridge, MA | fl oz | 90 | 90 | 90 | 90 | 90 |
| Admixture | fl oz | 0 | 0 | 0 | 0 | 16 |
| Test Results | | | | | | |
| Plastic Appearance | | good | v. tight | v. tight | good | best |
| Swipe | | trace | none | none | trace | light |
| 14 day net strength | psi | 1640 | 1590 | 1650 | 1510 | 1380 |
| % of Control | % | — | 97.0% | 100.6% | 92.1% | 84.1% |
| % over 1900 psi | % | −13.68% | −16.32% | −13.16% | −20.53% | −27.37% |
| Production Increase | | | | | | |
| Feed time | sec | 1.70 | 1.50 | 1.50 | 1.30 | 1.30 |
| Cycle time | sec | 7.55 | 7.13 | 7.32 | 7.14 | 6.80 |
| Cycles/Min | # | 7.95 | 8.42 | 8.20 | 8.40 | 8.82 |
| Est. cycle time | sec | 7.55 | 7.13 | 7.32 | 7.14 | 6.80 |
| Cycle Time Reduction | sec | — | 0.42 | 0.23 | 0.41 | 0.75 |
| Cycle Time Reduction | % | — | 5.6% | 3.0% | 5.4% | 9.9% |
| Production Increase | % | 0.0% | 5.6% | 3.0% | 5.4% | 9.9% |
| Strength Increase | | | | | | |
| 28 day | % | — | −3.0% | 0.6% | −7.9% | −15.9% |

The results in Table 2-2 show that the inventive admixture provided the best plastic appearance of cast blocks, and it decreased the manufacturing cycle time to cast blocks.

EXAMPLE 3

Samples were prepared and tested according to ASTM C140, ASTM1262, and ASTM 1372. The samples were prepared from a mixture containing 200 kg of Type 10 cement, 1290 kg of concrete sand, 860 kg of birds-eye stone, 0.4 liters of a polymeric carboxylate backbone with polyether group side chains dispersant, sold as RHEOMIX® 730FC-S from Master Builders, Inc., Cleveland, Ohio, 0.6 liters of an admixture containing 40% butyl stearate, 3% carboxylated styrene butadiene latex, 8% ethoxylated nonylphenol, and 49% water by weight, and a sufficient amount of water to provide a castable mixture. The mixture was cast into full size units with the measurements described below in Table 3-1. From each unit, a 2"×4"×8" coupon was cut from the unit for compression testing, the results of which are detailed in Table 3-2. Also, an additional sample was taken from the unit for absorption testing in accordance with ASTM C140, the results of which are detailed in Table 3-3.

TABLE 3-1

| Unit | Estimated Width* (in.) | Average Height (in.) | Average Length (in.) | Received Weight (lb) |
|---|---|---|---|---|
| 1 | 11.73 | 7.72 | 17.65 | 79.14 |
| 2 | 11.64 | 7.74 | 17.63 | 78.14 |
| 3 | 11.69 | 7.72 | 17.63 | 77.32 |
| 4 | 11.64 | 7.74 | 17.65 | 78.84 |
| 5 | 11.65 | 7.73 | 17.63 | 78.50 |
| Average | 11.67 | 7.73 | 17.64 | 78.39 |

*The width dimension of this unit included a split surface. Therefore, this dimension was an estimated average rather than an average calculated from measured dimensions. Variations from the specified dimensions do not include the width dimension.

Maximum Variation from Specified Dimensions = 0.02 in.

Maximum Permitted Variation from Specified = 0.125 in.

Variation Between Heights of Measured Specimens = 0.01 in.

TABLE 3-2

| Unit | Avg. Width (in.) | Avg. Height (in.) | Avg. Length (in.) | Coupon Weight (lb.) | Max. Comp. Load (lb.) | Tested Comp. Strength (psi) | h/t | h/t correct. factor | Correct. Comp. Strength (psi) |
|---|---|---|---|---|---|---|---|---|---|
| 1 | 1.95 | 4.00 | 8.06 | 4.98 | 63660 | 4050 | 2.05 | 1.01 | 4071 |
| 2 | 1.92 | 4.02 | 8.04 | 4.81 | 59900 | 3880 | 2.09 | 1.01 | 3917 |
| 3 | 1.93 | 3.99 | 8.03 | 4.89 | 64600 | 4168 | 2.07 | 1.01 | 4196 |
| 4 | 1.92 | 4.01 | 8.04 | 4.93 | 64600 | 4185 | 2.08 | 1.01 | 4222 |
| 5 | 1.92 | 3.99 | 8.06 | 4.81 | 57780 | 3734 | 2.08 | 1.01 | 3763 |
| Avg. | 1.93 | 4.00 | 8.05 | 4.89 | 62108 | 4000 | | | 4030 |

TABLE 3-3

| Unit | Received Weight (lb.) | Immersed Weight (lb.) | Saturated Surface - Dry Weight (lb.) | Oven- Dry Weight (lb.) | Ab- sorption lb/ft$^3$ | % | lb/ft$^3$ |
|---|---|---|---|---|---|---|---|
| 1 | 4.50 | 2.63 | 4.60 | 4.38 | 7.0 | 5.0 | 139.1 |
| 2 | 4.47 | 2.61 | 4.57 | 4.35 | 7.2 | 5.2 | 138.0 |
| 3 | 4.42 | 2.58 | 4.52 | 4.29 | 7.4 | 5.4 | 137.9 |
| 4 | 4.43 | 2.59 | 4.52 | 4.30 | 7.0 | 5.0 | 138.8 |
| 5 | 4.35 | 2.54 | 4.46 | 4.23 | 7.3 | 5.3 | 137.2 |
| Average | 4.44 | 2.59 | 4.54 | 4.31 | 7.2 | 5.2 | 138.2 |

The results in Tables 3-2 and 3-3 show that cementitious articles formulated using the admixture of the present invention exceed the requirements for ASTM C1372. ASTM C1372 requires a minimum net compressive strength of 3000 psi and an absorption of no more than 13 lb/ft$^3$.

For freeze-thaw testing according to ASTM 1262, five samples were prepared as above. Samples from the full size unit were cut to 1.25"×4"×8". The weight of each sample is listed below in Table 3-4, the accumulative residue weight is listed below in Table 3-5, and the specimen weight loss percentage is listed below in table 3-6. The samples went through 200 freeze thaw cycles in water.

TABLE 3-4

| Unit | Received Weight (lb.) | Calculated Oven-Dry Initial Weight (lb.) |
|---|---|---|
| 1 | 3.1694 | 3.1326 |
| 2 | 3.1248 | 3.0765 |
| 3 | 3.1484 | 3.0963 |
| 4 | 3.0122 | 2.9188 |
| 5 | 3.1176 | 3.0779 |

TABLE 3-5

Accumulative Residue Weight (lb.)

| Unit | 0 cycles | 50 cycles | 100 cycles | 150 cycles | 200 cycles |
|---|---|---|---|---|---|
| 1 | 0 | 0.0023 | 0.0035 | 0.0045 | 0.0060 |
| 2 | 0 | 0.0022 | 0.0046 | 0.0060 | 0.0101 |
| 3 | 0 | 0.0023 | 0.0069 | 0.0094 | 0.0115 |
| 4 | 0 | 0.0024 | 0.0052 | 0.0087 | 0.0150 |
| 5 | 0 | 0.0023 | 0.0046 | 0.0076 | 0.0125 |

TABLE 3-6

Specimen Weight loss (%)

| Unit | 0 cycles | 50 cycles | 100 cycles | 150 cycles | 200 cycles |
|---|---|---|---|---|---|
| 1 | 0 | 0.1 | 0.1 | 0.1 | 0.2 |
| 2 | 0 | 0.1 | 0.1 | 0.2 | 0.3 |
| 3 | 0 | 0.1 | 0.2 | 0.3 | 0.4 |
| 4 | 0 | 0.1 | 0.2 | 0.3 | 0.5 |
| 5 | 0 | 0.1 | 0.1 | 0.2 | 0.4 |

The results in Tables 3-5 and 3-6 show that cementitious articles formed using the admixture of the present invention surpass the requirements for ASTM C1262.

Additionally, samples were prepared and tested as above for testing according to ASTM C1262, except that salt water was used in place of water for the freeze thaw testing. This testing does not conform to any standardized testing requirement, but was run for informational purposes only. Because of the salt water, the samples were only tested through 15 cycles. The weight of each sample is listed below in Table 3-7, the accumulative residue weight is listed below in Table 3-8, and the specimen weight loss percentage is listed below in table 3-9.

TABLE 3-7

| Unit | Received Weight (lb.) | Calculated Initial Weight (lb.) |
|---|---|---|
| 1 | 3.1546 | 3.1186 |
| 2 | 3.1350 | 3.0902 |
| 3 | 3.1470 | 3.0758 |
| 4 | 3.1698 | 3.1254 |
| 5 | 3.1666 | 3.1330 |

TABLE 3-8

Accumulative Residue Weight (lb.)

| Unit | 0 cycles | 15 cycles |
|---|---|---|
| 1 | 0 | 0.5134 |
| 2 | 0 | 3.0902 |
| 3 | 0 | 1.4840 |
| 4 | 0 | 0.2514 |
| 5 | 0 | 0.0274 |

TABLE 3-9

| | Specimen Weight Loss (%) | |
| Unit | 0 cycles | 15 cycles |
| --- | --- | --- |
| 1 | 0 | 16.5 |
| 2 | 0 | 100.0 |
| 3 | 0 | 48.2 |
| 4 | 0 | 8.0 |
| 5 | 0 | 0.9 |

Although the invention has been described in detail through the above detailed description and the preceding examples, these examples are for the purpose of illustration only and it is understood that variations and modifications can be made by one skilled in the art without departing from the spirit and the scope of the invention.

What is claimed is:

1. A cement admixture for cementitious compositions comprising a polymer, a surfactant, and a hydrophobic material that is an organic ester of an aliphatic carboxylic acid, wherein the polymer is present in the admixture from about 0.5% to about 20% based on the total weight of the admixture, the organic ester of an aliphatic carboxylic acid is present in the admixture from about 20% to about 50% based on the total weight of the admixture, and the surfactant is present in the admixture from about 3% to about 15% based on the total weight of the admixture, said admixture providing water repellant properties to the cementitious composition.

2. The admixture of claim 1, wherein the organic ester of an aliphatic carboxylic acid is represented by the general formula $R_1$–$R_2$, wherein $R_1$ is $C_{12}$–$C_{18}$ aliphatic carboxylic acid ester, and $R_2$ is a linear or branched $C_1$ to $C_{10}$ alkyl.

3. The admixture of claim 2, wherein the aliphatic carboxylic acid ester is selected from the group consisting of stearate, oleate, laurate, palmitate, myristic ester, linoleic ester, coconut oil, castor oil, and mixtures thereof.

4. The admixture of claim 1, wherein the hydrophobic material is selected from the group consisting of butyl stearate, butyl oleate, and mixtures thereof.

5. The admixture of claim 1, wherein the polymer is a latex polymer selected from the group consisting of styrene butadiene copolymer latex, polyacrylate latex, polymethacrylate latex, carboxylated styrene latex, isoprene-styrene copolymer latex, and mixtures thereof.

6. The admixture of claim 5, wherein the latex polymer is a styrene butadiene copolymer latex.

7. The admixture of claim 1, wherein the surfactant is selected from the group consisting of ionic surfactants, non-ionic surfactants, amphoteric surfactants, and mixtures thereof.

8. The admixture of claim 1, wherein the surfactant is an ethoxylated alkyl phenol having the general structure

wherein R=$C_1$ to $C_{20}$ alkyl, and R'=—$(CH_2CH_2$—$O)_n$—, n=1 to 100.

9. The admixture of claim 1, wherein the polymer has a number average molecular weight from about 500 to about 50,000.

10. A cementitious composition comprising cement and at least one cement admixture, wherein the admixture comprises a polymer, a surfactant, and a hydrophobic material that is an organic ester of an aliphatic carboxylic acid, wherein the polymer is present in the admixture from about 0.5% to about 20% based on the total weight of the admixture, the organic ester of an aliphatic carboxylic acid is present in the admixture from about 20% to about 50% based on the total weight of the admixture, and the surfactant is present in the admixture from about 3% to about 15% based on the total weight of the admixture, said admixture providing water repellant properties to the cementitious composition.

11. The cementitious composition of claim 10, wherein the polymer, the surfactant, and the hydrophobic material are added to the cement as an admixture.

12. The cementitious composition of claim 11, wherein the admixture is present in an amount from about 2 fluid ounces per hundred weight of cement to about 40 fluid ounces per hundred weight of cement.

13. The cementitious composition of claim 10, wherein the organic ester of an aliphatic carboxylic acid is represented by the general formula $R_1$–$R_2$, wherein $R_1$ is $C_{12}$–$C_{18}$ aliphatic carboxylic acid ester, and $R_2$ is a linear or branched $C_1$ to $C_{10}$ alkyl.

14. The cementitious composition of claim 13, wherein the aliphatic carboxylic acid ester is selected from the group consisting of stearate, oleate, laurate, palmitate, myristic ester, linoleic ester, coconut oil, castor oil, and mixtures thereof.

15. The cementitious composition of claim 10, wherein the hydrophobic material is selected from the group consisting of butyl stearate, butyl oleate, and mixtures thereof.

16. The cementitious composition of claim 10, wherein the polymer is a latex polymer selected from the group consisting of styrene butadiene copolymer latex, polyacrylate latex, polymethacrylate latex, carboxylated styrene latex, isoprene-styrene copolymer, and mixtures thereof.

17. The cementitious composition of claim 16, wherein the latex polymer is a styrene butadiene copolymer latex.

18. The cementitious composition of claim 10, wherein the surfactant is selected from the group consisting of ionic surfactants, non-ionic surfactants, amphoteric surfactants, and mixtures thereof.

19. The cementitious composition of claim 10, wherein the surfactant is an ethoxylated alkyl phenol having the general structure

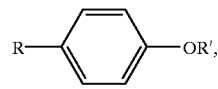

wherein R=$C_1$ to $C_{20}$ alkyl, and R'=—$(CH_2CH_2$—$O)_n$—, n=1 to 100=.

20. The cementitious composition of claim 10, wherein the polymer has a number average molecular weight from about 500 to about 50,000.

21. The cementitious composition of claim 10, wherein the cement is selected from the group consisting of calcium aluminate cement, hydratable alumina, hydratable aluminum oxide, colloidal silica, silicon oxide, portland cement, magnesia, pozzolan containing cements, and mixtures thereof.

22. The cementitious composition of claim 10 further comprising at least one of a set accelerator, a set retarder, an air entraining agent, an air detraining agent, a foaming agent, a defoaming agent, a corrosion inhibitor, a shrinkage reducing agent, a pozzolan, a dispersing agent, a pigment, a coarse aggregate, and a fine aggregate.

23. A method of forming a cementitious composition comprising mixing cement and at least one cement admixture, wherein the admixture comprises a polymer, a surfactant, and a hydrophobic material that is an organic ester of an aliphatic carboxylic acid, wherein the polymer is present in the admixture from about 0.5% to about 20% based on the total weight of the admixture, the organic ester of an aliphatic carboxylic acid is present in the admixture from about 20% to about 50% based on the total weight of the admixture, and the surfactant is present in the admixture from about 3% to about 15% based on the total weight of the admixture, said admixture providing water repellant properties to the cementitious composition.

24. The method of claim 23, wherein the polymer, the surfactant, and the hydrophobic material are added to the cement as an admixture.

25. The method of claim 24, wherein the admixture is present in an amount from about 2 fluid ounces per hundred weight of cement to about 40 fluid ounces per hundred weight of cement.

26. The method of claim 23, wherein the organic ester of an aliphatic carboxylic acid is represented by the general formula $R_1$–$R_2$, wherein $R_1$ is $C_{12}$–$C_{18}$ aliphatic carboxylic acid ester, and $R_2$ is a linear or branched $C_1$ to $C_{10}$ alkyl.

27. The method of claim 26, wherein the aliphatic carboxylic acid ester is selected from the group consisting of stearate, oleate, laurate, palmitate, myristic ester, linoleic ester, coconut oil, castor oil, and mixtures thereof.

28. The method of claim 23, wherein the hydrophobic material is selected from the group consisting of butyl stearate, butyl oleate, and mixtures thereof.

29. The method of claim 23, wherein the polymer is a latex polymer selected from the group consisting of styrene butadiene copolymer latex, polyacrylate latex, polymethacrylate latex, carboxylated styrene latex, isoprene-styrene copolymer latex, and mixtures thereof.

30. The method of claim 29, wherein the latex polymer is a styrene butadiene copolymer latex.

31. The method of claim 23, wherein the surfactant is selected from the group consisting of ionic surfactants, non-ionic surfactants, amphoteric surfactants, and mixtures thereof.

32. The method of claim 23, wherein the surfactant is an ethoxylated alkyl phenol having the general structure

wherein R=$C_1$ to $C_{20}$ alkyl, and R'=—$(CH_2CH_2$—$O)_n$—, n=1 to 100.

33. The method of claim 23, wherein the polymer has a number average molecular weight from about 500 to about 50,000.

34. The method of claim 23, wherein the cement is selected from the group consisting of calcium aluminate cement, hydratable alumina, hydratable aluminum oxide, colloidal silica, silicon oxide, portland cement, magnesia, pozzolan containing cements, and mixtures thereof.

35. The method of claim 23, further comprising at least one of a set accelerator, a set retarder, an air entraining agent, an air detraining agent, a foaming agent, a defoaming agent, a corrosion inhibitor, a shrinkage reducing agent, a pozzolan, a dispersing agent, a pigment, a coarse aggregate, and a fine aggregate.

* * * * *